March 29, 1960 K. TRÜMPER 2,930,606
HYDRO-PNEUMATIC SUSPENSIONS FOR VEHICLES, PARTICULARLY
RAILWAY ROLLING STOCK
Filed March 27, 1957 3 Sheets-Sheet 1

Inventor:
Konrad Trümper
by Burgess Dinklage Sprung
attorneys

United States Patent Office 2,930,606
Patented Mar. 29, 1960

2,930,606

HYDRO-PNEUMATIC SUSPENSIONS FOR VEHICLES, PARTICULARLY RAILWAY ROLLING STOCK

Konrad Trümper, Siegen, Westphalia, Germany, assignor to Siegener Eisenbahnbedarf Aktiengesellschaft, Kreis-Siegen, Germany, a firm Application March 27, 1957, Serial No. 648,858

Claims priority, application Germany March 29, 1956

17 Claims. (Cl. 267—3)

The invention relates to a hydraulic-pneumatic suspension for vehicles, especially rolling stock.

It is known to suspend two-axle railway rolling stock so as to absorb vertical and horizontal shocks with the aid of semi-elliptic leaf springs and spring links and to mount multiple-axle vehicles on bogies which are suitably cushioned. In the case of horizontal deflection of the cushioned portion of the rail vehicles stabilizing forces are produced and act through the manner of suspension in the spring links. The period of oscillation of the suspended portion of the vehicle is approximately dependent upon the mass of the vehicle and almost exclusively a function of the length of the spring links. Pneumatic springs are also known for vehicles in which air cushions are arranged in ring-shape and, due to their shape, absorb vertical forces and to a certain extent horizontal forces so as to cushion horizontal shocks and restrict transverse movements of the suspended part.

The space which the known suspensions occupy is considerable. Their pivotal points are frequently far apart. Especially in the case of runner wheels of small diameter, which are preferably employed today, especially in the case of articulated platform trains, it is important that the suspension does not take up a great deal of space. If, in order to increase the travelling comfort, soft springing characteristics are sought in the case of mechanical suspension, the spring deflection is considerably greater than the maximum permissible vertical adjustment range.

In the case of modern rail vehicles it is also necessary to take into consideration the fact that, due to the light construction, the difference in weight between the empty and loaded vehicles becomes greater in proportion to the total weight, so that, in the case of oscillations governed by mass, they possess very different frequencies under the two conditions mentioned.

The object of the invention is to make the resilience figure $$\frac{dp}{ds}$$

of the vertical and horizontal suspension variable and the suspended masses as far as possible proportional, so as to attain maximum spring action under all loads, especially as regards the hitherto frequently neglected horizontal absorption and maximum travelling comfort in the case of relatively slight spring deflection.

The suspension is, as far as possible, a concentrated compact construction and must be sturdy and reliable in operation. It must be possible to fit it as a built-in unit either on the axle bearing or also on the undercarriage itself, whereby the former arrangement presents the advantage that the axle bearing itself carries all the component spring elements, whereas the latter arrangement has the advantage that the elements of the suspension itself form part of the cushioned masses.

This object is attained according to the invention in that a hydro-pneumatic suspension for vehicles, especially railway rolling stock, is constructed in such a manner that displacement cells are provided which translate horizontal and vertical pressures and shocks into fluid pressure which is conducted to suitable positive-acting spring elements and the pressure circuits are coupled with the cells. The coupling of the pressure circuits is so arranged that it is only effective in a preselected frequency range of the vehicle oscillations.

Cylinders with pistons are preferably provided as displacement cells and connected with one or preferably two spring or resiliency accumulators with progressive spring characteristic so that the spring rigidity in the range of the smaller oscillations is dependent upon the load and consequently the period of oscillation is practically independent of the mass, and absorbing devices are provided which act strongly in the case of larger amplitudes of oscillation. Throttles with adjustable cross-section can be employed for the absorption. Additional absorption can be provided in the form of a differential piston in the conduit leading from the vertical cylinder to the horizontal cylinder, which piston is loaded on its larger side by the vertical spring and on its smaller side by the pressure of the horizontal spring. The differential piston is maintained in its intermediate position by suitable means. Slow equalization of pressure can be attained by means of longitudinal bores of relatively small diameter as long as the differential piston is not bearing against the upper or lower ends of its surrounding cylinder, due to excessive pressure in one of the two pressure circuits. The movements of the differential piston are preferably damped by some known means. The horizontal and vertical cylinders can operate on a common spring accumulator or on separate spring accumulators, when, however, connections must always exist between the conduits and be provided with damping means. Owing to the low forces which occur, the horizontal cylinders have a smaller diameter but the pistons which operate therein are constructed as stepped pistons for the purpose of more rapidly increasing the spring rigidity.

Air cushions may be provided as spring elements. Springs of solid material may also be additionally arranged in the form of pressure or coil springs, care being taken to see that the characteristics of the total effective suspension correspond with the requirements to be met. With a view to obtaining the most compact construction, the springs of solid material may with advantage be arranged in the form of coil spring columns surrounding the vertical cylinders.

In order to keep the spring course as small as possible in spite of soft cushioning and to compensate for leakage losses, a pump is provided which is preferably driven from the axle through the intermediary of an eccentric but which may also have independent drive. If the pump is driven by the axle, pressure containers may also be provided additionally in order to compensate the sinking movement of the vehicle in relation to the upper edge of the track under increasing load when stopping, for example in passenger traffic. For goods traffic such an arrangement will not generally be necessary, especially when the pump is so arranged that, after travelling a short distance, it lifts the vehicle frame by a relatively slight amount of the height adjustment, even if at first it is seated after loading. The pump is controlled by a slide valve which is operated by the relative movement of axle and frame. In order to avoid rapid reverse of the control in the case of occasional shocks, the control slide valve is damped in relation to the frame movement.

Two embodiments of the invention are illustrated by way of example in the accompanying drawings, in which:

Fig. 4 shows a modified form of construction of the arrangement according to the invention in horizontal section in the longitudinal direction of the vehicle.

Figure 3:
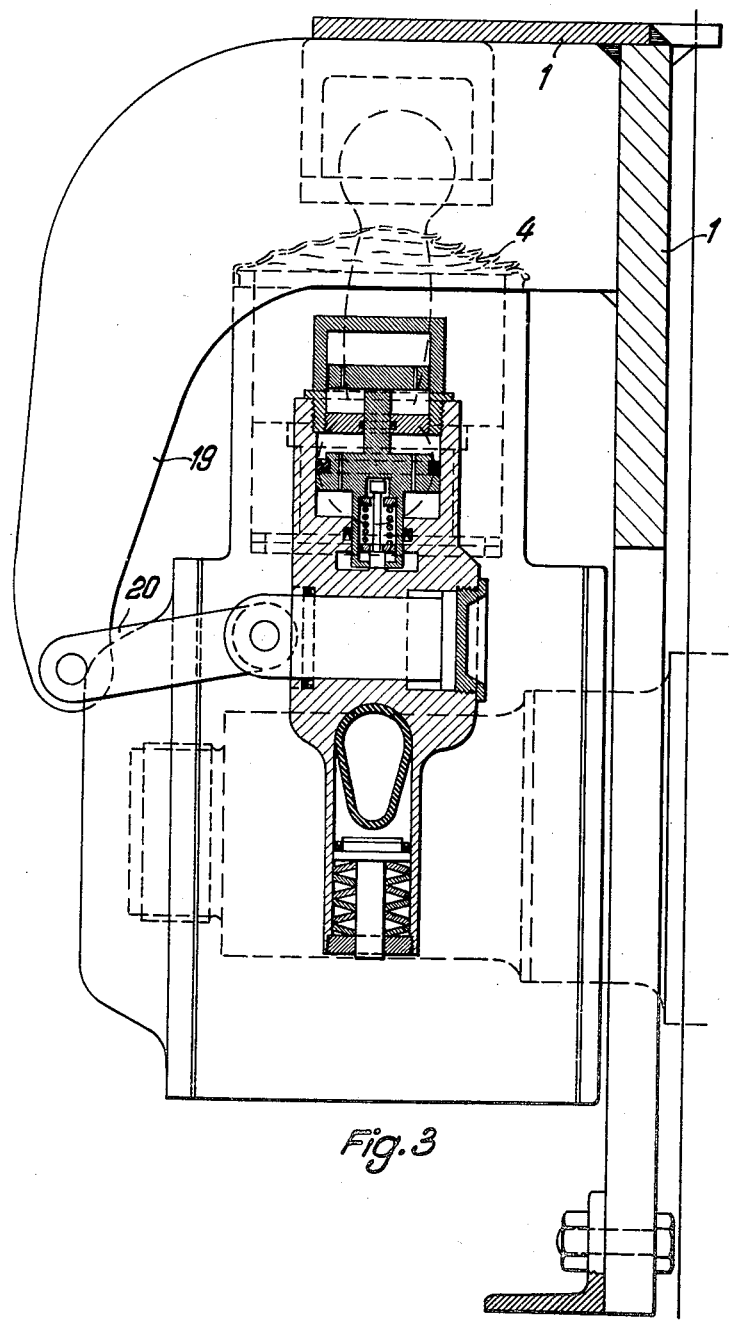
Fig. 3 is a section taken on line III—III of Fig. 4.

The axle 27 is supported on the vehicle frame 1 by means of preferably two piston rods 3 with ball-shaped heads and a suitable number of interposed rubber springs 2. These rods rest on pistons 5 which slide in cylinders 6 arranged on or integral with the axle bearing housing. To obtain a tight seal between the cylinders and the piston rods 3 bellows-shaped sleeves 4 are provided (Fig. 3). Rubber pads are arranged on the pistons 5 and prevent damage in the event of the pistons seating in the cylinder 6. Conduits 8 lead from the cylinders 6 and are connected through the intermediary of throttles 9 to a common connecting conduit 10. Conduits 11 branch from the conduit 10 and lead to pressure spaces 12 of hollow cylindrical shape in which piston slide valves 13 operate and are sealed by suitable packings in relation to columns of spring washers 14 which rest at their other end against rigid end walls of the cylinders. An air spring might be used in place of spring 14. Conduits 15 also lead from the conduit 10 to the spring accumulators 16 which are also filled with pressure fluid and also contain a volume of air 17 which is separated by a bladder 18, for example, from the pressure fluid.

On each longitudinal side of each vehicle at least one horizontal cylinder is arranged perpendicularly to the direction of travel. Suitable rigid arms 19 as shown in Fig. 3 are provided on the frame 1 and connected, preferably by means of a movable link 20, to the horizontal pistons 21 which are constructed as stepped pistons 22, 23 for the purpose of rapidly increasing the pressure. The conduit 25 leads from the pressure space 24 of the horizontal cylinder through a throttle 26 to the common conduit 10.

The axle 27 of the vehicle is mounted by means of a roller bearing 28 in the axle bearing housing and carries an eccentrically mounted element 29 which imparts movement to the plunger 31 of a pump against the force exerted by the spring 30. The plunger 31 operates in a pump pressure space 31a which is hollowed out in the pump housing 32. The pressure space 31a is connected by a ball valve 33 with the sump 38. The pump pressure space 31 is also connected by a ball valve 34 and a port 35 with a cylinder in which the control slide valve 41 operates. The operating space of the pressure valve 34 is in turn connected with the sump by a ball valve 36. A control piston 37 is linked to the portion of the frame cushioned by rubber springs 2 and is movable in the housing 32 of the control slide valve against the action of a spring 40. This spring 40 is supported at its other end by a guide and a conical intermediate member on the control slide valve 41 which operates in the cylinder space 43 of the housing 39. The control slide valve 41 is in turn supported by the housing through the intermediary of a spring 46. A circular recess 44 is formed in the wall of the housing and connected by a conduit 45 to the common conduit 10. An aperture 44a communicating with the sump 38 is provided in the lower portion of the housing.

The device above described operates in the following manner:

The weight of the vehicle and load compresses the pressure liquid through the intermediary of the vertical cylinder 6 and piston 7, and this liquid in turn compresses the springs 14 of solid material and the air spring 17, sudden shocks being damped by the throttles 9. The horizontal piston and the suspension attached thereto are at the same time loaded by the pressure through the intermediary of the throttles 26, so that the horizontal spring is dependent upon mass whereas its period of oscillation is almost independent of mass. By the combination of mechanical and air springs, the spring characteristic is obtained which represents a coefficient proportional to the load. The differential quotient $$\frac{dp}{ds}$$

is taken as spring coefficient, whereby $p$ indicates the load in kilograms and $s$ the deflection in meters. As the natural frequency $$\omega^2 = \frac{c}{m}$$

it remains constant under all loads when $c$ is proportional to the mass $m$.

In substance, this only applies for small oscillations such as occur in practice, so that in the small range of oscillation $$\frac{dp}{ds}$$

which in itself is variable, can be taken as constant and considered as representing the suspension constant $c$. The throttle 26 is intended to prevent sudden strong vertical shocks from causing horizontal oscillations. The construction of the horizontal piston as a stepped piston ensures that, in the case of large lateral deflections, the counterforce increases rapidly. As the horizontal pistons on each side of the vehicle act in opposite directions, they only need to be operative in one direction to hold the vehicle.

In order, in spite of the soft spring characteristic preferably chosen for the combined air-solid body springs, to ensure the necessary short spring deflection, the pump, the control slide valve 42 of which is damped in relation to the movements of the vehicle frame by the springs 40, is arranged so as to prevent shocks acting in such a manner that pressure liquid is fed into the system. If the vehicle sinks on taking a load, the slide valve 41 will lower its bulge 42 out of the position shown in Fig. 1. Consequently it will open the path to the common conduit 10 via the valve 34, conduit 35, annular space 44 and conduit 45 and supply pressure fluid by the pump. The valve 34 prevents any flow of fluid in the opposite direction. If nevertheless, the pressure in the working space of the valve 34 has risen too high, it can pass into the sump through the safety valve 36. If the vehicle body rises too high due to unloading, the control slide valve 41 will rise with its bulge 42 and open the path from the conduit 10 via the conduit 45 to the sump 38 via the annular space 44 and aperture 44a. Oil is fed from the sump to the pressure space 31a of the pump through the valve 33. Therefore in both instances mentioned oil will be fed to or removed from the pressure circuit until the desired middle position is reached.

Figure 2:
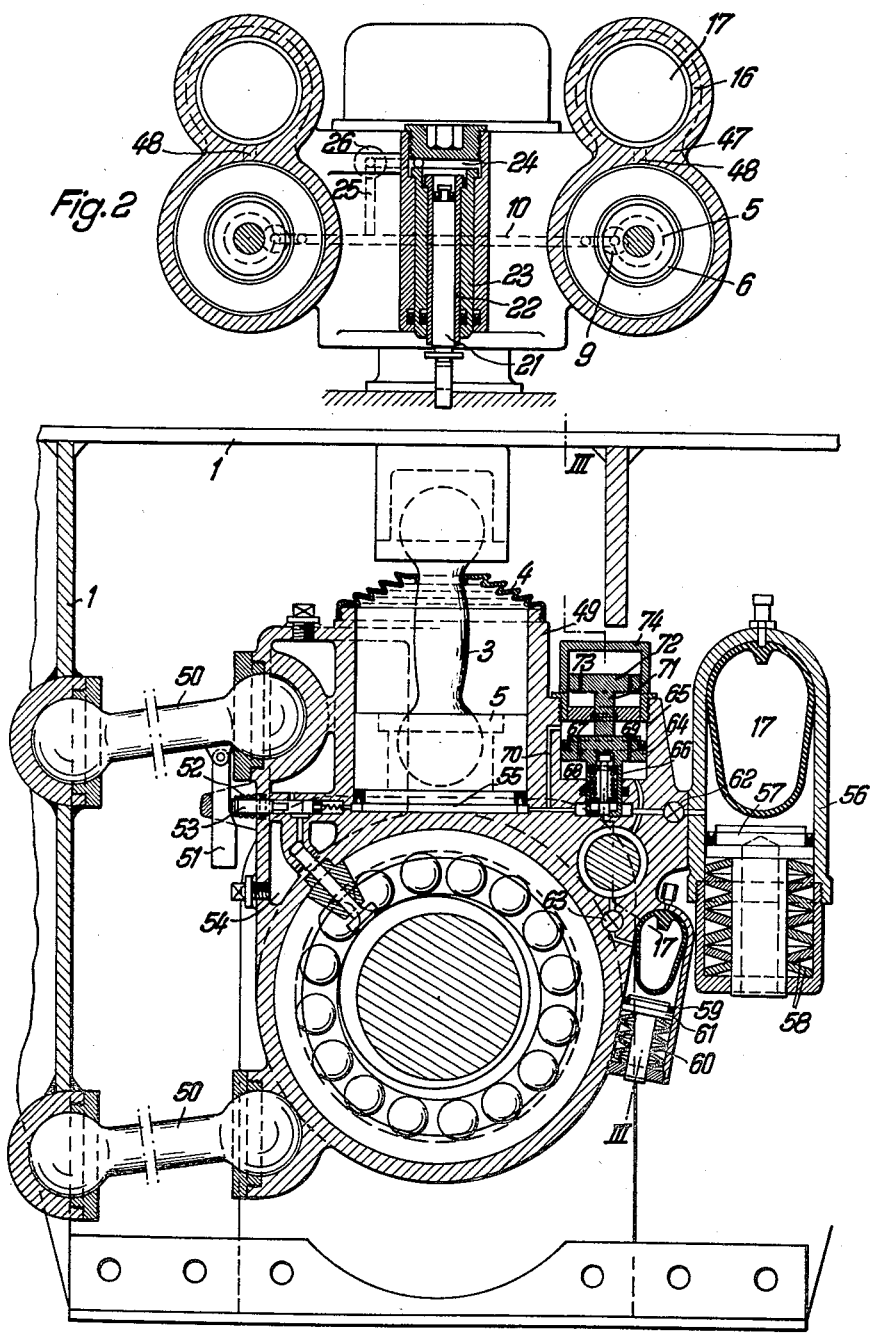
Fig. 2 shows the arrangement of Fig. 1 in horizontal section taken above the axle support, the spring accumulation and horizontal piston being viewed in normal position.

In Fig. 2 a horizontal section is illustrated which shows an arrangement which has been found particularly practical. Vertical cylinders 6 and spring accumulators 16 are arranged on a common housing 47. There can be a direct connection 48 between the spring accumulator and horizontal cylinder. On the other hand a connection 10 with throttles 9 leads to the conduit 25 which in turn is connected to the pressure space 24 of the horizontal cylinder by a throttle 26.

In Figs. 3 and 4 a modified arrangement is shown in which only one vertical cylinder 49 is provided in which a piston 5 operates. The axle bearing housing may be held vertically shiftable by means of links 50. A pump, similar in construction to that already described, is controlled by a slide valve 51 which is articulated on one of the links 50 and changes its position relatively to the housing as function of the difference in height between the vehicle and axle. The slide valve 51 actuates a control piston 53 through the intermediary of an inclined run-on surface against the action of a spring 52, which piston controls the feed of oil supplied by the pump from the storage tank 54 into the pressure space 55 of the vertical cylinder 49.

The air and solid body springs are united in a common housing 56 so that the pressure fluid supplied compresses the volume of air on one side and the solid body spring 58, through the intermediary of a plunger disc 57, on the other side.

A separate spring arrangement is provided for the horizontal suspension in which air spring 17 and solid body spring 60 are united in the housing 59 but nevertheless separated by a plunger disc 61.

In both arrangements throttles 62, 63 are provided. The two pressure circuits are connected.

Figure 1:
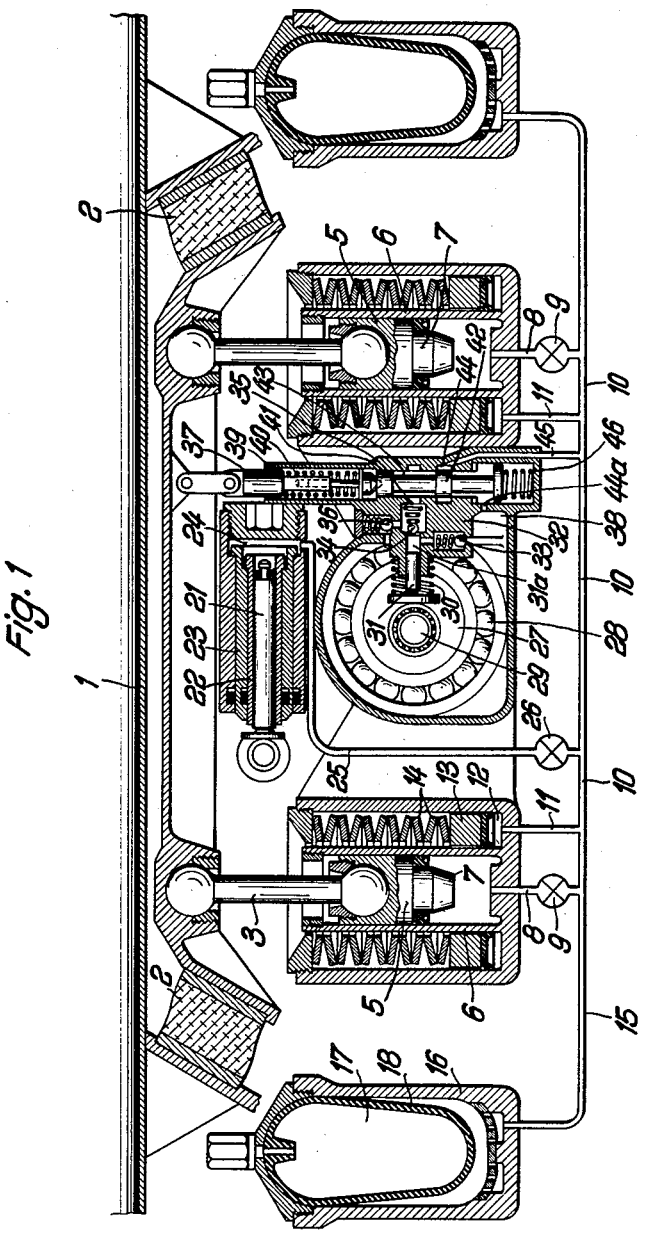
Fig. 1 is a diagrammatic section through an arrangement according to the invention, whereing for reasons of clarity, the spring accumulator is displaced outwards and the horizontal piston turned through an angle of 90°.

Instead of the throttle 26 in the arrangement illustrated in Fig. 1, a differential piston 64 is here employed which slides in a cylinder 65, is maintained in its middle position by some known means such as a spring 66 and divides the cylinder into two separate spaces 67 and 68. The only direct communication between the spaces 67 and 68 is established by means of passages 69 which are bored in the differential piston. The cylinder space 67, which is of larger cross-section, is connected with the vertical cylinder 49 by means of the conduit 70 and on the other side with the spring system 56 coordinated to it, by the throttle 62, whereas the cylinder space 68 of smaller cross-section is in communication with the horizontal cylinder and also with its coordinated spring system 59 via the throttle 63.

The differential piston itself carries on its end face a plunger 71 which in turn has a plunger disc 72 with bores 73 which is shiftable in a cylinder 74 filled with oil.

The function of the differential piston is on the one hand to ensure that a rise in pressure in the vertical piston, due to greater mass, is distributed to the horizontal spring system, but on the other hand to avoid the occurrence of chattering, that is that rises in pressure are only passed on in both directions in damped state. Finally, in the case of a stationary piston, slow equalization of pressure must be possible and in the case of sudden unusually heavy shocks no equalization of pressure takes place.

The differential piston operates in the following manner:

As a slower equalization of pressure is possible through the passages 69 between the two spring accumulators, the differential piston 64 itself is always in middle position. When vertical or horizontal oscillations occur, the differential piston 64 is shifted upwards or downwards. The larger surface is directed towards the vertical cylinder and the smaller surface faces towards the horizontal cylinder. In the case of oscillations of normal amplitude, the differential piston does not come into contact with the ends of its cylinder 65 so that the two pressure spaces always intercommunicate. Should very small or very numerous differences in pressure occur which can be described as chattering, the damping of the differential piston becomes effective and, for example, a rapid succession of vertical shocks will not act on the horizontal cushioning. In the case of exceptionally large and sudden increases in pressure, however, the differential piston is first damped by its absorbing device yet will move to such an extent that it comes into contact with the top or the bottom of its cylinder with the result that the small aperures 69 are also closed and all communication between the two spring system is interrupted.

A number of modifications of subordinate features of the arrangement according to the invention can be carried out without departing from the scope of the invention. For example, the number of spring accumulators and pistons may be varied; their arrangement changed; additional pressure chambers may be provided and the arrangement may be partly on the axle bearing and partly on the vehicle body.

I claim:

1. The combination of a wheeled vehicle having a wheel axle and a suspension system for the axle, said system comprising a suspension arrangement operatively connected to the axle adjacent each end thereof, each said arrangement comprising a vertically disposed piston-cylinder arrangement connected to the axle, a spring element operatively interposed between the vehicle body and the axle for response to vertically directed loads, spring element hydraulic loading means for hydraulically loading the spring element, a horizontally disposed piston-cylinder arrangement connected to and extending parallel to the vehicle axle, a fluid pressure circuit including an accumulator and conduit means interconnecting the accumulator with the cylinders of the piston-cylinder arrangements for passage of fluid with respect to said cylinders upon movement of the pistons and with the spring element hydraulic loading means, load carrying means mechanically interconnecting the vehicle body and the vertical piston-cylinder arrangements, motion transferring means mechanically interconnecting the body and the horizontal piston-cylinder arrangements, whereby displacement of the vehicle body can be transferred into hydraulic pressure and relative movement between the body and the axle is facilitated and hydrostatic pressure produced by vertically directed load imposes load on the spring element and the horizontal piston-cylinder arrangements, said fluid pressure circuit further including damping means for limiting the effect of movement of a piston of a piston-cylinder arrangement disposed in one of said directions on the position of the piston of a piston-cylinder arrangement disposed in the other of said directions.

2. The combination of claim 1, wherein the pressure is arranged so that it becomes effective within a certain frequency range.

3. The combination of claim 1, wherein the fluid pressure circuit includes at least one spring accumulator having progressive spring characteristics whereby the spring rigidity of the horizontal cushioning is dependent upon the load in the range of smaller oscillations and as a result the period of oscillation is independent of the mass, and damping means are provided in the connecting conduits between the two piston-cylinder arrangements which become effective at greater amplitudes of oscillation.

4. The combination of claim 1, wherein the fluid pressure circuit includes at least one spring accumulator having progressive spring characteristics whereby the spring rigidity of the horizontal cushioning is dependent upon the load in the range of smaller oscillations and as a result the period of oscillation is independent of the mass and throttles with adjustable cross-sections are provided in the connecting conduits between the two piston-cylinder arrangements which become effective at greater amplitudes of oscillation.

5. The combination of claim 1, wherein the conduit means includes a conduit interconnecting the horizontal disposed piston-cylinder arrangement and the vertically disposed piston-cylinder arrangement, a cylinder disposed in said conduit, a differential piston slidable in said cylinder, means connecting the said vertical and horizontal piston arrangements to said cylinder at the larger and smaller areas respectively of said differential piston, a double-acting spring normally maintaining said differential piston in its middle position, said differential piston having bores of relatively small diameter connecting the two ends of the cylinder to slowly equalize the pressure therein as long as the piston is not in contact with either of the end walls of the cylinder as a result of being under excessively high pressure in one end of the cylinder.

6. The combination of claim 5, wherein the differential piston is damped by means of a plunger disc operating in a cylinder against a pressure medium therein and having longitudinal bores and a rod connects this plunger disc with the differential piston.

7. The combination of claim 1, wherein the pressure fluid acts on at least one common spring accumulator.

8. The combination of claim 1, wherein the pressure fluid acts on two separate and vertically disposed spring accumulators.

9. The combination of claim 1, wherein the horizontal cylinder is of smaller diameter than the vertical cylinder but it is constructed as a stepped piston.

10. Combination according to claim 1, wherein the spring element consists of a spring of solid material.

11. Combination according to claim 1, wherein the spring element consists of a spring of solid material arranged around the vertical cylinder.

12. Combination according to claim 1, wherein the spring element consists of a spring of solid material arranged in the spring accumulator.

13. Combination according to claim 1, wherein a pump is arranged in the housing of said axle of the vehicle said pump being connected to said fluid pressure circuit.

14. Combination according to claim 1, wherein a pump is arranged in the housing for said axle and driven from the axle of the vehicle said pump being connected to said fluid pressure circuit.

15. Combination according to claim 1, wherein a pump is arranged in the housing for said axle and driven from the axle of the vehicle said pump being connected to said fluid pressure circuit and additional pressure containers are connected for operation to said pump.

16. Combination accordign to claim 1, wherein a pump is arranged in the housing for said axle and driven from the axle of the vehicle, said pump controlled by the relative movement between the axle and the frame of the vehicle through the intermediary of a control slide valve.

17. Combination according to claim 16, wherein the movement of the control slide valve is damped relatively to the frame of the vehicle.

References Cited in the file of this patent

UNITED STATES PATENTS

| | | |
|---|---|---|
| 886,617 | Lovejoy | May 5, 1908 |
| 1,301,474 | Martens | Apr. 22, 1919 |
| 1,600,542 | Gagg | Sept. 21, 1926 |
| 2,042,596 | Gouirand | June 2, 1936 |
| 2,279,120 | Hurley | Apr. 7, 1942 |
| 2,461,066 | Kent | Feb. 8, 1949 |
| 2,678,830 | Cigan et al. | May 18, 1954 |